(12) United States Patent
Pokharel et al.

(10) Patent No.: US 9,865,291 B1
(45) Date of Patent: Jan. 9, 2018

(54) PRIMARY AND SECONDARY SERVO TIMING GATES USED WITH SIMULTANEOUSLY OPERATING READERS

(71) Applicant: Seagate Technology LLC, Cupertino, CA (US)

(72) Inventors: Puskal Prasad Pokharel, Edina, MN (US); Gary E. Hillukka, Cokato, MN (US); Timothy F. Ellis, Excelsior, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/601,019

(22) Filed: May 22, 2017

(51) Int. Cl.
G11B 5/09 (2006.01)
G11B 5/58 (2006.01)
G11B 5/596 (2006.01)

(52) U.S. Cl.
CPC ...... *G11B 5/59688* (2013.01); *G11B 5/59616* (2013.01)

(58) Field of Classification Search
CPC . G11B 20/10009; G11B 5/09; G11B 2220/90; G11B 5/58; G11B 5/584; G11B 5/488; G11B 21/106; G11B 5/5526; G11B 5/59627; G11B 5/59633; G11B 5/012

USPC ............... 360/39, 77.01, 77.05, 77.06, 77.14
See application file for complete search history.

(56) References Cited

U.S. PATENT DOCUMENTS

| 5,255,136 A | 10/1993 | Machado et al. |
| 5,708,649 A | 1/1998 | Kamoto et al. |
| 5,739,973 A * | 4/1998 | Echigo ................ G11B 5/4893 360/77.14 |
| 5,796,540 A | 8/1998 | Jones et al. |
| 6,411,452 B1 | 6/2002 | Cloke |
| 7,092,184 B2 | 8/2006 | Settje et al. |

* cited by examiner

*Primary Examiner* — Nabil Hindi
(74) *Attorney, Agent, or Firm* — Hollingsworth Davis, LLC (57) ABSTRACT

First and second read channel logic circuits are configured to process first and second signals communicated from respective first and second readers that simultaneously read from a magnetic disk. A first servo detection circuit generates a primary servo gate based on timing data from the first reader. The primary servo gate is used for processing the first signal via the first read channel logic. A second servo detection circuit that generates a secondary servo gate based on the primary servo gate and an adjustment value. The secondary servo gate is used for processing the second signal via the second read channel logic.

20 Claims, 6 Drawing Sheets

PRIMARY AND SECONDARY SERVO TIMING GATES USED WITH SIMULTANEOUSLY OPERATING READERS

SUMMARY

The present disclosure is directed to primary and secondary servo timing gates used with simultaneously operating readers. In one embodiment, first and second read channel logic circuits are configured to process first and second signals communicated from respective first and second readers. The first and second readers simultaneously read from a magnetic disk. A first servo detection circuit generates a primary servo gate based on timing data read from the magnetic disk via the first reader. The primary servo gate is used for processing the first signal via the first read channel logic. A second servo detection circuit that generates a secondary servo gate based on the primary servo gate and an adjustment value. The secondary servo gate is used for processing the second signal via the second read channel logic.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disks. In embodiments described below, a hard disk drive includes multiple readers (e.g., magnetoresistive sensors) that can read from a disk simultaneously. Simultaneously active readers can be used to increase sequential data rate or for other purposes (e.g., to increase reliability, service different requests in parallel, etc.). The multiple readers read data from the same disk, and may be configured in a number of different ways. In one configuration, two or more readers may be located on the same head or head-gimbal assembly (HGA) and simultaneously read the same disk surface. In another configuration, the two or more readers may be located on different heads that are mounted to different arm/actuator assemblies. The readers may read the same surface or different surfaces of the same disk.

In order to allow multiple readers to simultaneously read the same disk, the signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

Generally, servo control logic uses data encoded onto the disks (sometimes referred to as servo marks or servo wedges) to facilitate locating the heads over tracks and locating data sectors within the tracks. Servo control logic includes position control logic that reads data embedded within the servo marks (e.g., burst patterns, track identifiers) to determine the current track location as well as a position error relative to the center of the current track. The servo logic also includes servo timing detection logic that detects the beginning of the servo marks and provides timing signals that are used by a number of subsystems of the drive, e.g., to synchronize the subsystem's logic circuits with signals being provided by the reader.

Because a number of subsystems rely on servo detection logic to provide timing signals, the servo detection logic (and signals used to detect servo marks) can have a significant effect on drive performance. When two or more readers are used, this can impact performance even more under some scenarios. For example, if two readers that are going to be used simultaneously (e.g., to combine signals from both readers) are independently attempting to detect servo marks, then both will need to acquire the respective timing signals. Assuming it takes one reader (and its associated servo detection logic) significantly longer than the other to acquire the timing signal, then further operations cannot commence until the slowest of the readers/logic completes timing acquisition. Even if the reader signals are not going to be combined (e.g., separate, parallel, data streams from different tracks), it would be advantageous to reduce the time needed to acquire the servo timing signal for all concurrently operating readers.

In embodiments described below, a servo control architecture is described that facilitates decreasing time needed to obtain a timing signal for a drive that uses multiple, simultaneously active, readers. This architecture can reduce latency and increase robustness and reliability of the drive as a whole. The servo control systems can be used with a number of different multiple reader arrangements, some of which are shown in the block diagram of FIG. 1.

Figure 1:
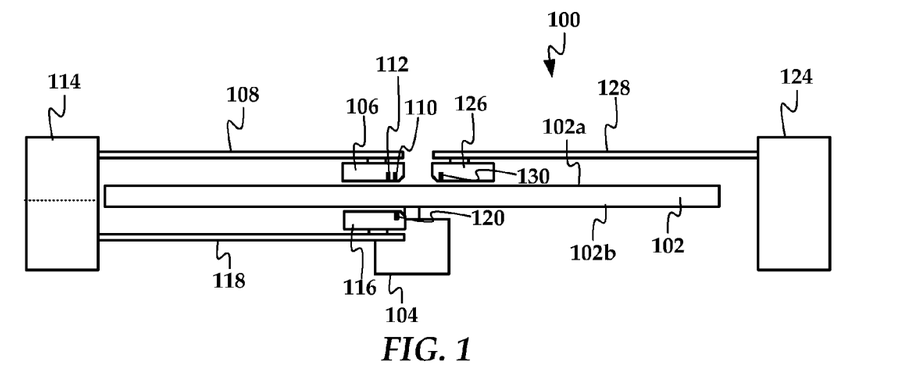
FIG. 1 is a diagram of an apparatus according to an example embodiment.

In FIG. 1, a diagram illustrates an apparatus 100 according to an example embodiment. An apparatus 100 includes a magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. In one embodiment, the slider includes two or more read transducers 110, 112, also referred to as readers, reader stacks, read elements, etc. These read transducers 110, 112 each provide a signal in response to changing magnetic fields on the disk 102, and are coupled to a controller (not shown) where the separate signals are independently processed.

In another embodiment, the apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 includes at least one read transducer 120. The read transducer 120 is capable of reading data from disk surface 102b simultaneously with one or both of read transducers 110, 112 reading from disk surface 102a. In this embodiment, the first slider 106 may include all or only one of the two or more read transducers 110, 112.

In another embodiment, the apparatus 100 includes a third slider 126 supported by a third arm 128. The third slider 126 is held over the first surface 102a of the disk 102 and a second actuator 124 causes the third arm 118 to move to different tracks on the disk 102. The arm 128 and actuator 124 move independently of arm 108 and actuator 114. The slider 126 includes at least one read transducer 130. The read transducer 130 is capable of reading data from disk surface 102a simultaneously with one or both of read transducers 110, 112 of first slider 106. In this embodiment, the first slider 106 may include all or only one of the two or more read transducers 110, 112.

In the examples shown in FIG. 1, the disk 102 may be recorded with conventional tracks (e.g., separated by guard bands) or partially-overlaid adjacent tracks. Examples of the latter include shingled magnetic recording (SMR) and interlaced magnetic recording (IMR). The read transducers may each be dedicated to a separate track and read just the separate track. In other cases, the two or more read transducers may overlap two or more tracks and/or have two or more readers reading at least part of the same track. The latter of these arrangements may used in schemes such as multiple signal/sensor magnetic recording (MSMR) and two-dimensional magnetic recording (TDMR).

Figure 2:
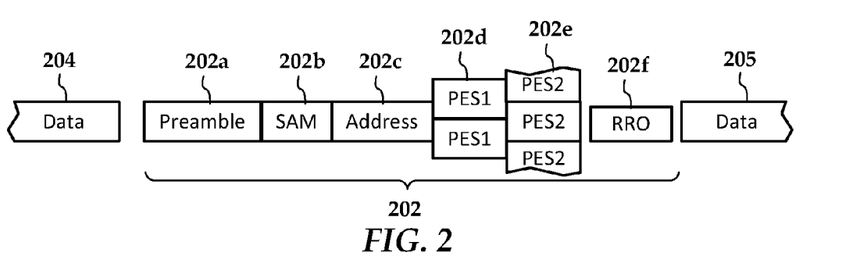
FIG. 2 is a block diagram showing a servo mark according to an example embodiment.

As noted above, a servo control systems uses servo marks that are pre-written to the disk before it is put into use, e.g., in a factory process. A servo mark 202 according to an example embodiment is shown in FIG. 2. The servo mark 202 is located between a preceding data sector 204 and a following data sector 205 of a track. The data sectors 204, 205 store user data, and present disclosure may be used with any type and arrangement of data sectors. The illustrated servo mark 202 includes a preamble 202a, servo address mark (SAM) 202b, servo address 202c, position error signal (PES) fields 202d, 202e, and one or more repeatable runout (RRO) fields 202f The preamble 202a is a known magnetic pattern that is read back as a signal. The SAM 202b also includes a known pattern of bits that are read following the preamble 202a. Together, the preamble 202a and SAM 202b allow a read/write channel to positively determine that the beginning of the servo wedge 202 has been detected, and facilitates synchronizing the servo signal to read the subsequent data stored in the servo wedge 202.

The address field 202c includes a pattern that identifies the track in which the servo wedge 202 is located. The PES fields 202d, 202e are burst fields that are used to determine a position error signal. For example, the PES fields 202d, 202e may facilitate controlling alignment and seek movements of the read/write head. The RRO fields 202f also facilitate proper alignment of the read/write heads on a track by correcting for known runout errors. It will be understood that the servo mark 202 is presented here for purposes of illustration and not limitation. Servo control embodiments described herein may be used with any arrangement and format of servo marks known in the art.

Figure 3:
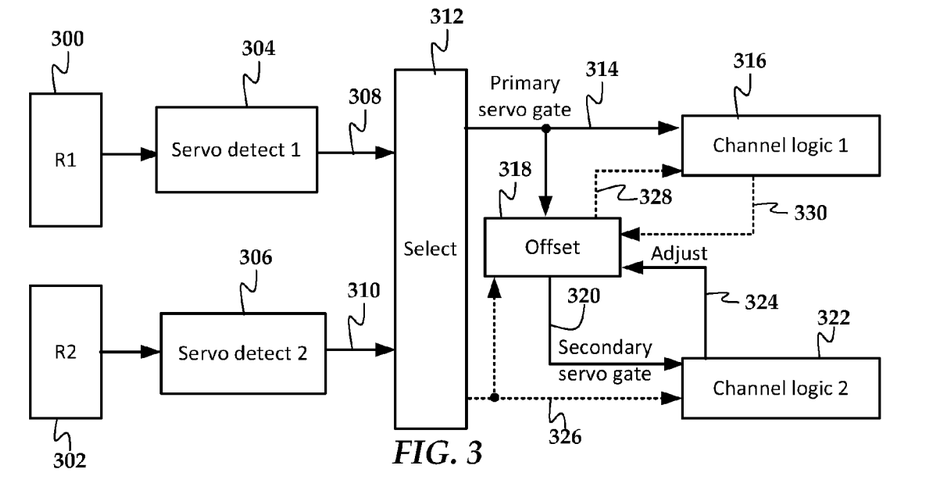
FIG. 3 is a block diagram illustrating processing of servo mark timing signals according to an example embodiment.

In FIG. 3, a block diagram illustrates processing of servo mark signals for multiple readers 300, 302 according to an example embodiment. Signals generated by the readers 300, 302 are used by respective servo detection blocks 304, 306. The servo detection blocks 304, 306 use circuits and algorithms for detecting the data encoded at the start of the servo marks. The outputs 308, 310 of the servo detection blocks include at least a timing signal (e.g., a waveform pulse or transition) that marks the start of a servo sector once the servo has been detected. This timing signal is referred to as a servo gate (or sgate) and is used to synchronize logic circuits in the read/write channels with the signals being received by the readers 300, 302. The outputs 308, 310 may also provide an indication that servo gate acquisition has not yet occurred.

The outputs 308, 310 are processed by a selector module 312 that determines which of the outputs 308, 310 are to be used as a primary servo gate 314 based on a fixed or dynamic criterion. This criterion may include which reader 300, 302 acquired the servo gate first, historical reliability of the readers, fixed configuration, etc. In this example the first timing signal 308 from the first reader 300 is selected as the primary servo gate 314. A first channel logic 316 associated with the signals of the first reader 300 uses the primary servo gate 314, e.g., to synchronize circuits for reading of the servo data, user data, etc. The first channel logic 316 may include servo control logic, platform processor subsystems, disk controller, read/write channel/servo demodulator, preamplifier, motor controller, etc.

It is assumed that the readers 300, 302 are located at a known physical offset from each other relative to the disk, such that a time offset between the servo marks traversed by the readers 300, 302 can be determined. For example, if the readers 300, 302 are on the same head, then a factory calibration can be used to determine the spacing and this can be used as a constant offset. In configurations with more variables affecting the spacing, additional data (e.g., temperature, orientation angle, current radial location, etc.) may be used to estimate the spacing. The time offset can be used by functional block 318 to produce a secondary servo gate 320.

The secondary servo gate 320 is used by second channel logic 322 associated with the signals of the second reader 302. Because there is a predictable offset between the first and second readers 300, 302, the secondary servo gate 320 can be relied upon as a reasonably accurate timing signal for the second channel logic 322 even though the secondary servo gate 320 did not originate with second reader 302. Because there will be some unpredictable variation between the reader signals, e.g., due to noise, electrical tolerances, etc., the second channel logic 322 may provide an adjustment 324 to the offset functional block 318. The second channel logic 322 will utilize decoding algorithms (e.g., timing recovery) that provide an estimate of the error between the expected signal timing (which is provided by secondary servo gate 320) and the actual detected pattern, which can be time offset from the predicted value. This estimate of time error can be used to improve subsequent decoding operations, as well as being used for the adjustment signal 324.

In the arrangement shown in FIG. 3, the selector 312 can continuously reevaluate the servo detect signals 308, 310 and use either reader 300, 302 for primary servo gate. If the first reader 300 and first servo detect logic 304 are selected, they are used as primary servo gate 314 for first channel logic 316, and second channel logic 322 is driven by the secondary servo gate 320 which is derived from the primary servo gate 314. If the second reader 302 and second servo detect logic 306 are selected, they are used as primary servo gate 326 for second channel logic 322, and first channel logic 316 is driven by the secondary servo gate 328. In the latter case, the first channel logic 316 provides an adjustment 330 to the offset module 318.

In this way, the reader 300, 302 that is currently providing the best performance will be used to provide the primary servo gate, which is used as the basis for timing all of the logic sections 316, 322. This will minimize latency in acquiring time synchronization, and ensures robust operation in the event of reader errors or anomalies. Generally, if one detection block 304, 306 is already synchronized to the pattern on the disk, the other(s) 304, 306 can be quickly synchronized to that instead of independently synchronizing to the pattern on the disk detected by the readers 300, 302.

Once a servo timing detection block 304, 306 has successfully identified a series of servo marks and identified the timing separation between the servo marks, it can utilize a timer that indicates a predicted start of each servo mark. In this way, servo marks can be more quickly and reliably detected, assuming any timing differences between the timer and the actual separation between the servo marks are within a range that can be handled by the timing recovery algorithm used by the servo decoder. In embodiments described herein, the timer can be implemented as two or more counters, with each counter being dedicated to the processing logic of each reader that is simultaneously reading from the disk.

Figure 4A:
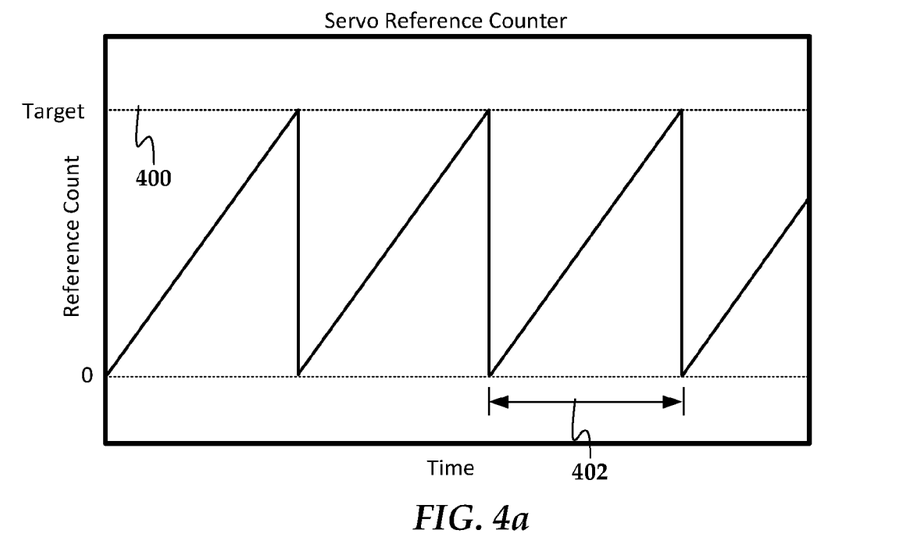
FIGS. 4a and 4b are graphs of servo gate counters according to an example embodiment.

Generally, a dedicated reference counter can provide a real-time indication of elapsed time. The resolution of the reference counter is determined by the frequency of a clock that drives the counter. As seen in FIG. 4, a graph shows how a counter may be utilized according to an example embodiment. The target counter value 400 is found during the initial servo timing acquisition and set by the servo timing detection logic. The target counter value 400 represents the estimated time 402 between the start of two adjacent servo marks. Once the target counter value 400 is set, the counter will automatically reset to zero, signaling to the servo timing detection logic that another servo mark pattern will start in the reader signal. The servo timing detection logic may make small changes to the target value 400 during operation, e.g., to account for random noise, variations in motor speed, etc. A more significant change to the target counter value 400 may be made under some conditions, such as transitioning to a different radial location of the disk that has different servo spacing.

In the embodiments described above, two or more reference counters are used to synchronize the two or more channel logic blocks (e.g., blocks 316 and 322 in FIG. 3). Each counter can be used as a separate trigger for respective channel logic that processes signals from two or more readers. While each counter may have approximately the same target value 400 due to the readers being in a region with the same servo timing, the counters may be offset from one another due to a physical separation between the readers.

In embodiments described below, a data storage device is configured to find the difference between primary and secondary counters, ideally making measurements of both counters at the same time. However, reading the counter data requires finite processor time and there could be additional wait times between successive reads of the counters. These delay times are represented as an offset to the actual counter value E. To compensate for expected but unpredictable offsets, primary and secondary counters are read multiple times, each read being separated by an expected read latency. After the counters are read, they are interpolated to the same time constant.

The order and number of times each counter is read can be adjusted based on the targeted implementation accuracy and other factors (e.g., allowable processing latency). Generally, an interpolation can be used to estimate what both counter values would be at the same point in time. Then, the difference between these values at this point in time is used to estimate the offset between the counters. This can eliminate or reduce errors caused by read latency and/or wait times between reads.

Figure 4B:
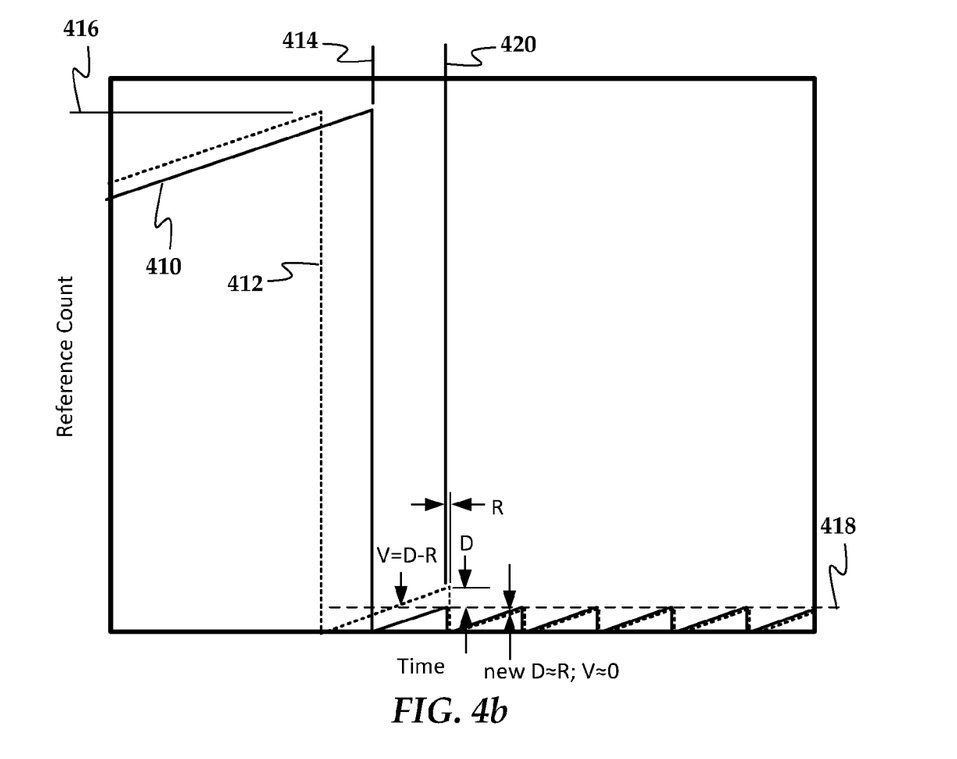

In the graph of FIG. 4b, an example is shown of reference counters being read. Curves 410 and 412 represent the value of respective first and second reference counters over time. Prior to time 414, neither servo detection blocks associated with the timers have acquired servo time synchronization, so each counter resets at a maximum value 416, e.g., a maximum value of an unsigned, n-bit, integer. On or about time 414, the detection circuit associated with the first counter 410 has acquired synchronization. This counter 410 becomes a time reference for the primary servo gate and the target value 418 is set based on the timing between servo marks found by the detection logic. The second counter 412 will become secondary servo gate and will be set to follow the first counter.

At time 420, the first counter 410 resets to zero after reaching the target value 418. Also prior to time 420, a correction value V for the secondary counter is determined. This correction value V is applied to the target value of second counter which resets to zero just after time 420. After time 420, the first counter 410 starts increasing and resets to zero when reaching the target value 418. Also after time 420, the value of V may be continually recalculated, and the secondary counter 412 is reset when the corrected target value is determined. Note that the counter traces 500, 502 are horizontally offset due to the temporal separation of the readers relative to the disk.

Figure 5A:
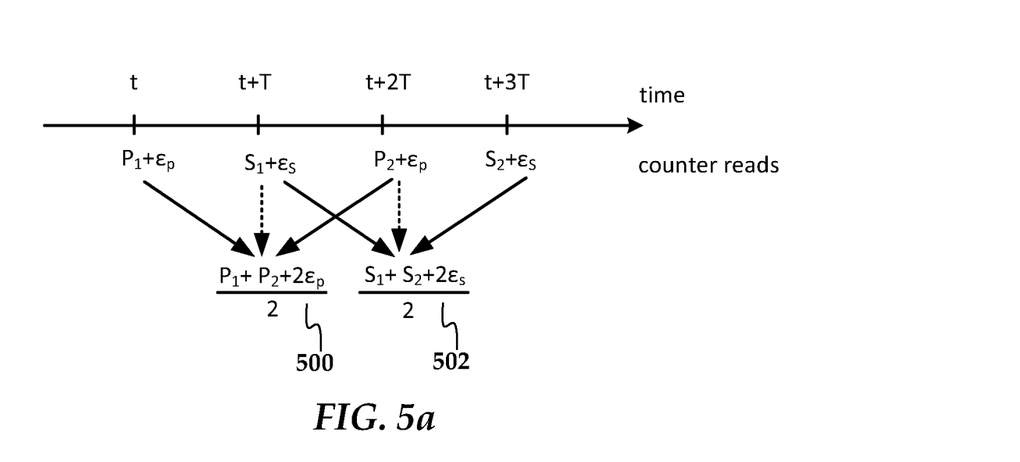
FIGS. 5a and 5b are timelines showing calculation of counter offsets by interpolating primary and secondary counters according to example embodiments.

In FIG. 5a, a timeline shows the calculation of counter offsets according to an example embodiment. The top values in the timeline represent target times in which a counter value is desired, and the bottom values indicate the actual primary or secondary counter values read ($P_n$ and $S_n$, respectively) as well as primary and secondary offsets ($\epsilon_s$ and $\epsilon_p$, respectively). The interpolated primary counter value 500 is a value of the primary counter that is estimated to be at the same time the secondary counter is read (at time t+T). The difference $\Delta_1$ between secondary and primary counters at time t+T is shown in Equation (1) below. Assuming there is no significant difference due to latency or wait times, $\epsilon_s \approx \epsilon_p$, and so $\Delta_1$ reduces to the form shown in Equation (2). Similarly, the interpolated secondary counter value 502 represents the value of the primary counter at time t+2T. The difference $\Delta_2$ between counters at time t+2T, again assuming $\epsilon_s \approx \epsilon_p$, is shown in Equation (3). The average $\Delta$ of $\Delta_1$ and $\Delta_2$ values is shown in Equation (4).

$$\Delta_1 = \frac{P_1 + P_2 + 2\varepsilon_p}{2} - (S_1 + \varepsilon_s) = \frac{P_1 + P_2}{2} - S_1 + (\varepsilon_p - \varepsilon_s) \quad (1)$$

$$\Delta_1 = \frac{P_1 + P_2}{2} - S_1 \quad (2)$$

$$\Delta_2 = P_2 - \frac{S_1 + S_2}{2} \quad (3)$$

-continued $$\Delta = \frac{\Delta_1 + \Delta_2}{2} = \frac{P_1 - S_2 + 3(P_2 - S_1)}{4} \quad (4)$$

In embodiments described herein, the value shown in Equation (4) can be used as D, the difference between the primary and secondary timers. The value of D, as described in greater detail below, is used to determine the distance between the timers at each measurement. Ideally, the value of D will be the same as R, which is a value that corresponds to the physical downtrack separation between the readers. Specifically, R is the time (in counts of the reference counter) it takes a fixed point on the recording medium to travel from one reader to the other. If there are differences between D and R, this is applied to the secondary counter limit as a correction value V.

Figure 5B:
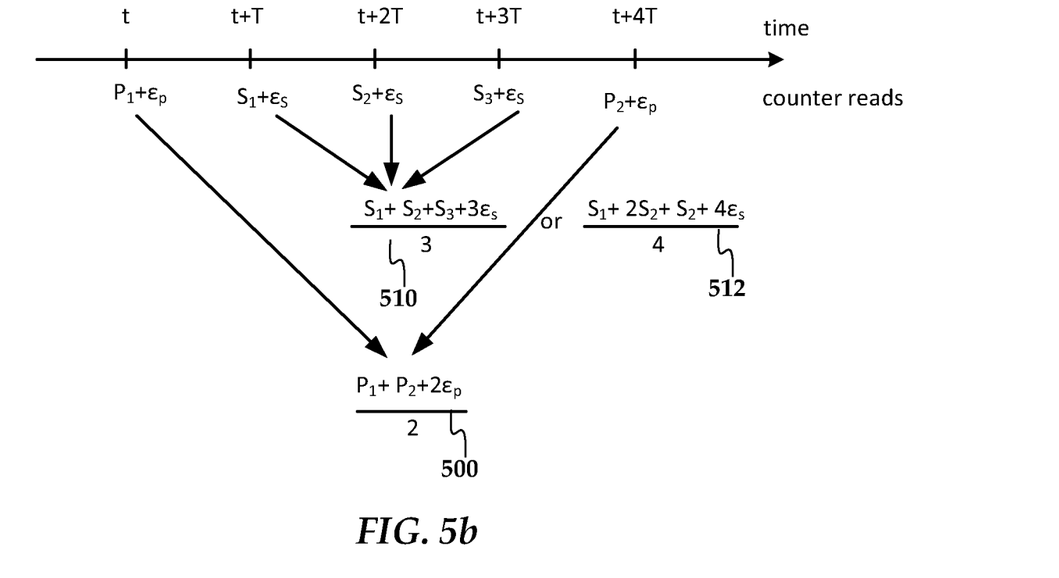

In FIG. 5b, a timeline shows the calculation of counter offsets according to another example embodiment. This graph uses similar conventions and assumptions used with FIG. 5a. This example involves taking three secondary counter measurements, which can improve the resolution of the offset calculation. The result will have a fractional component even though it is derived from integer counters. There are two interpolated secondary timer interpolation options 510 and 512 in this case. The second option 512 may be more efficient in some instances, because an integer division by four can be performed using a two-bit right shift of the binary value, avoiding the need to use an arithmetic logic unit to perform, e.g., a division by three in the first option 510. Equations (5) and (6) below show the resulting average value of $\Delta$ for the first and second options in the embodiments of FIG. 5b, again assuming $\epsilon_s \approx \epsilon_p$.

$$\Delta = P1 + P22 - S1 + S2 + S3 \quad \text{(option 1) (5)}$$
$$\Delta = \frac{P_1 + P_2}{2} - \frac{S_1 + S_2 + S_3}{3}$$

$$\Delta = \frac{P_1 + P_2}{2} - \frac{S_1 + 2S_2 + S_3}{4} \quad \text{(option 2) (6)}$$

Figure 6:
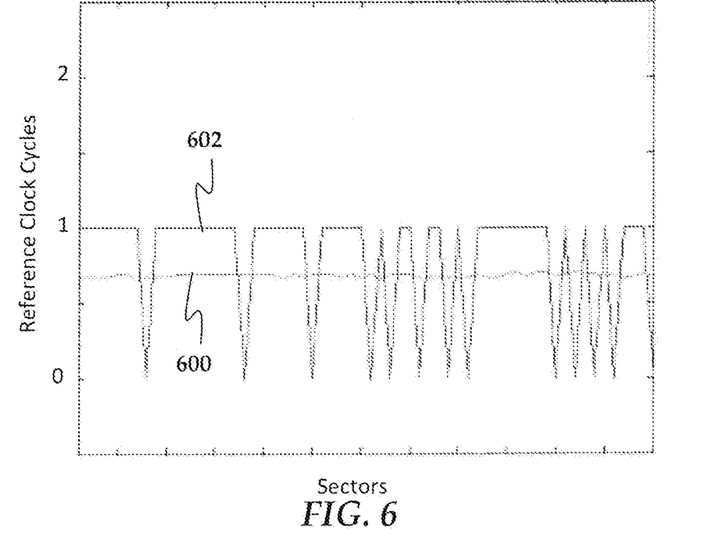
FIG. 6 is a graph showing counter adjustments applied to a secondary servo gate counter according to an example embodiment.

In FIG. 6, a graph illustrates an example of reference clock corrections applied to a secondary servo gate signal according to an example embodiment. Trace 600 represents the actual, physical separation between two readers as a function of reference clock cycles. For the reference counter, each increment represents one clock cycle. Note that the separation 600 is a fractional clock cycle, and the value of the separation 600 is substantially constant over all the sectors being analyzed. Trace 602 represents offsets applied to the secondary servo gate based on the continued calculation of V, which is described below. Because the counter offsets can only be whole numbers, the trace 602 transitions between two integer values (in this example 1 and 0), indicating that the counter offset trace 602 appropriately approximating the separation 600.

Note that the value V, which represents the correction to the secondary servo gate, is a function of both the difference D between timers and the separation R between readers, thus V=D−R. Ideally, after the initial synchronization of the primary with the secondary, V=0 (or D=R), although corrections may still need to be made due to, e.g., clock drift, random errors, etc. These corrections may be computed in firmware, e.g., by reading from memory locations that are written to by the counters. However, a system controller will likely take a non-trivial amount of time to read from the two memory locations, and this time may not be predictable in a non-real-time system.

Consider a case at time=t where the leading, primary counter P(t)=105, secondary counter S(t)=95, primary counter target value $T_p$=200, and secondary counter primary value $T_s$=203 (the latter two having been set from a previous correction/calibration). Further, consider that the expected reader-to-reader separation is two clock cycles (R=2). In this case, the difference D=105−95=10, and so V=10−2=8. Therefore, the new target value $T_s$=$T_p$−V=200−8=192. So when the primary counter in this case reaches 199 (after which it resets to 0 at the time it would reach 200), the secondary counter will be at S=189 and will reset to zero two counter cycles later than when the primary counter resets, namely at the time when S would reach 192. This will make the secondary counter two cycles behind the primary counter. Generally, the corrected secondary counter value $\hat{T}_s$ is $\hat{T}_s$=($T_p$−V) mod C, where C is the counter rollover value. For example, for an n-bit counter, C=$2^n$.

Figure 7:
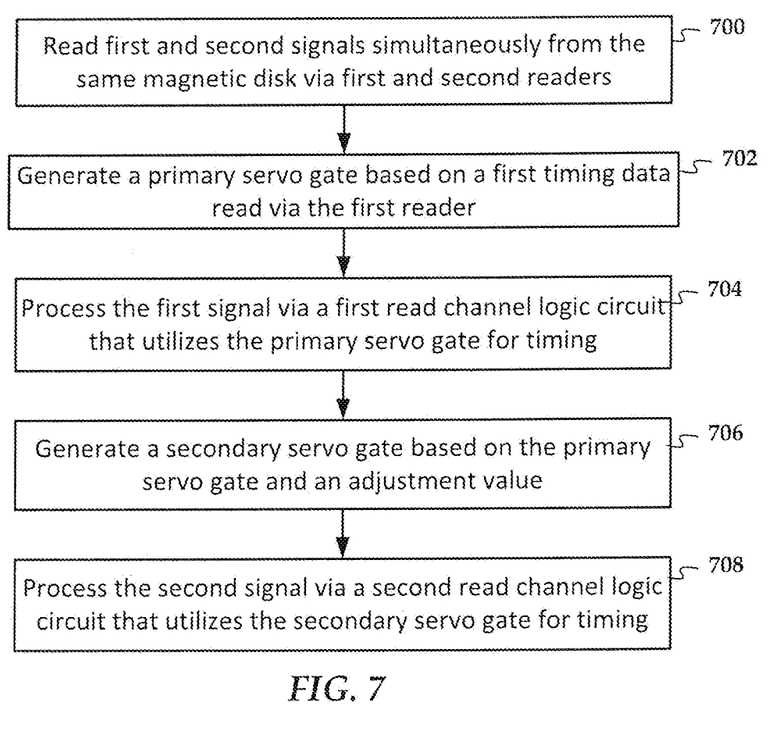
FIGS. 7 and 8 are flowcharts of methods according to example embodiments.

In FIG. 7, a flowchart illustrates a method according to an example embodiment. The method involves reading 700 first and second signals simultaneously from the same magnetic disk by via first and second readers. A primary servo gate is generated 702 based on a first timing data read from a magnetic disk via a first reader. The first reader is associated with a first read channel logic circuit. The first signal is processed 704 via a first read channel logic circuit that utilizes the primary servo gate for timing. A secondary servo gate is generated 706 based on the primary servo gate and an adjustment value. A second signal of the second reader is processed 708 via a second read channel logic circuit that utilizes the secondary servo gate for timing.

Figure 8:
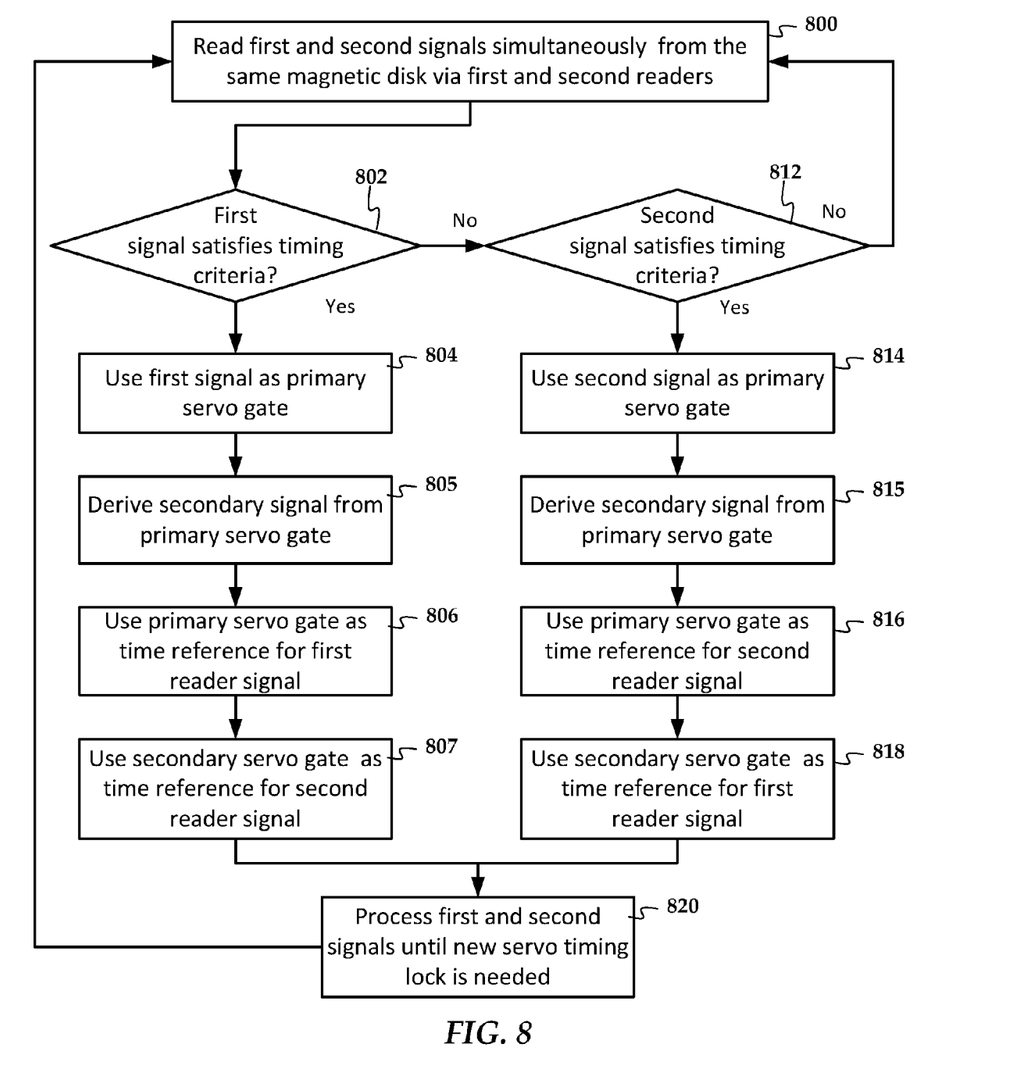

In FIG. 8, a flowchart illustrates a method according to another example embodiment. The method involves reading 800 first and second signals simultaneously from the same magnetic disk by via first and second readers. If the first signals satisfies a criterion (e.g., servo timing lock is detected from the first signal) as determined at block 802, then the first signal is used 804 as a primary servo gate. A secondary servo gate is derived 805 from the primary servo gate. The primary servo gate is used 806 as a time reference for the first reader signal and the secondary servo gate is used 807 as a time reference for the second reader signal.

If the first signal does not satisfy the criterion at block 802 but the second signal does satisfy the criterion at block 812, then the second signal is used 814 as a primary servo gate. A secondary servo gate is derived 815 from the primary servo gate. The primary servo gate is used 816 as a time reference for the second reader signal and the secondary servo gate is used 817 as a time reference for the first reader signal. Regardless of which path 804-807 or 814-818 is taken, the first and second signals are processed 820 using the indicated primary and secondary servo gates until a new servo timing lock is needed, e.g., long seek, resume from idle, servo read errors, etc.

Figure 9:
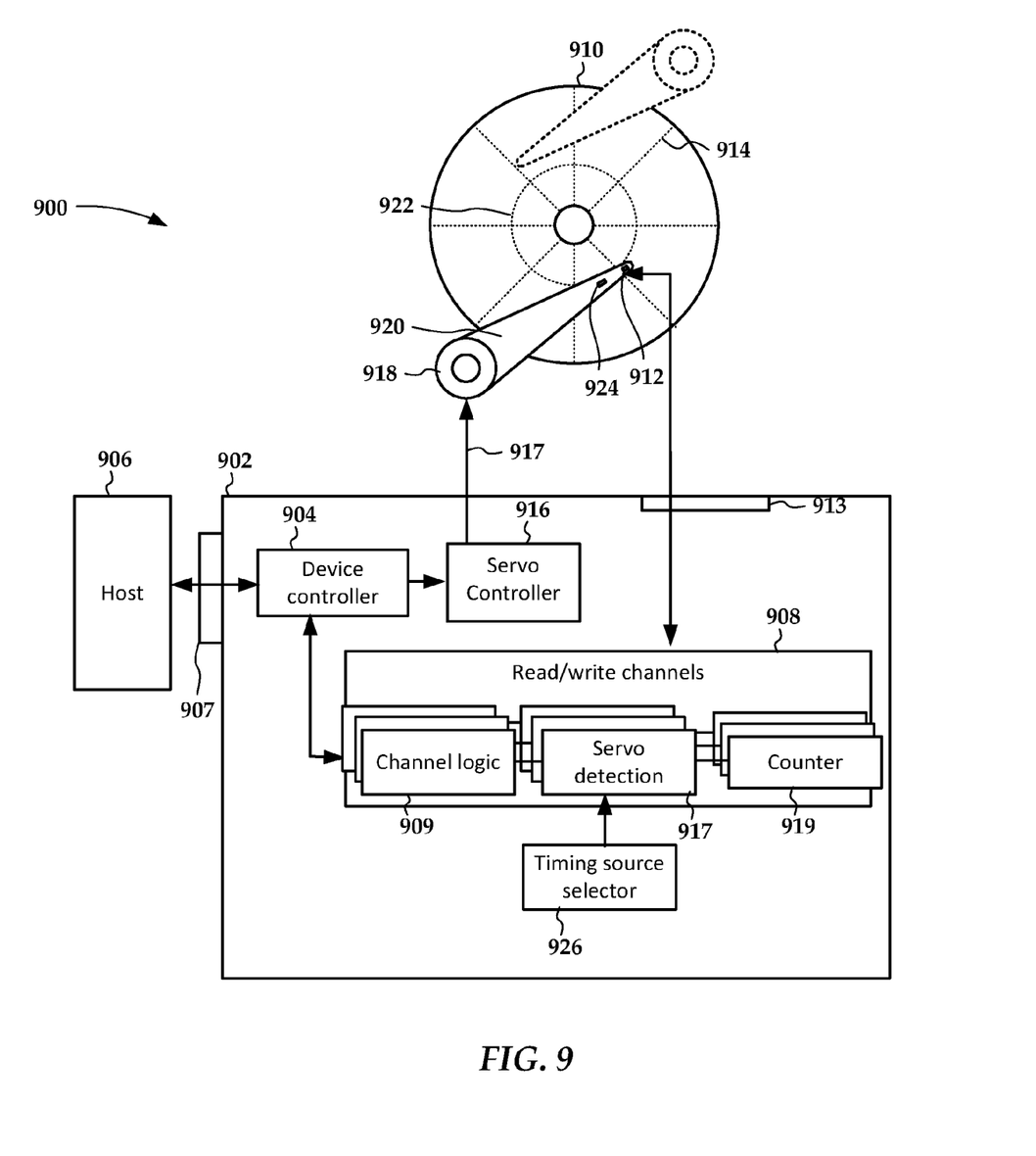
FIG. 9 is a block diagram of an apparatus according to an example embodiment.

In FIG. 9, a diagram illustrates components of a hard drive apparatus 900 that utilizes one or more read/write heads 912 according to example embodiments. The apparatus includes circuitry 902 such as a device controller 904 that processes read and write commands and associated data from a host device 906 via a host interface 907. The host interface 907 includes circuitry that enables electronic communications via standard bus protocols (e.g., SATA, SAS, PCI, etc.). The host device 906 may include any electronic device that can be communicatively coupled to store and retrieve data from a data storage device, e.g., a computer, a server, a storage controller. The device controller 904 is coupled to a read/write channel 908 that reads from and writes to surfaces of one or more magnetic disks 910.

The read/write channel 908 generally converts data between the digital signals processed by the device controller 904 and the analog signals conducted through one or more heads 912 during read operations. The one or more heads 912 include two or more read transducers capable of concurrently reading the disk 910, e.g., from the same surface or different surfaces. The read transducers may be configured to read in any mode, such as conventional single-track, conventional multi-track, MSMR, TDMR, SMR, IMR, etc.

The read/write channel 908 may include analog and digital circuitry such as decoders, timing-correction units, error correction units, etc. The read/write channel is coupled to the heads 912 via interface circuitry 913 that may include preamplifiers, filters, digital-to-analog converters, analog-to-digital converters, etc. As shown in the figure, the read/write channel 908 is capable of utilizing multiple channel logic sections 909 that each concurrently process one of a plurality of data streams from the multiple read transducers of the heads 912.

In addition to processing user data, the read/write channel 908 reads servo data from servo marks 914 on the magnetic disk 910 via the read/write head. All of the multiple readers of the heads 912 may be used to read servo data, or only a subset thereof. The servo data are sent to a servo controller 916, which uses the data to provide position control signals 917 to a VCM 918. The VCM 918 rotates an arm 920 upon which the read/write heads 912 are mounted in response to the control signals 917. The position control signals 917 may also be sent to microactuators 924 that individually control each of the heads 912, e.g., causing small displacements at each read/write head.

A plurality of servo timing detection circuits 917 are configured to generate servo gate signals used as timing by the respective channel logic sections 909 when processing signals from the respective read transducers of the heads 912. Each of the servo timing detection circuits 917 may utilize a dedicated counter 919 to estimate the start of the next servo mark 914. A timing source selector module 926 is operable by the device controller 904 or a subprocessor to coordinate operations between the servo timing detection circuits 917. The timing source selector module 926 determines that a timing data read from the magnetic disk 910 via a first one of the readers satisfies a criterion. In response, first timing data from the first reader is used to generate a primary servo gate. A first signal of the first reader is processed via a first one of the read channel logic circuits 917 utilizing the primary servo gate for timing. A secondary servo gate is generated based on the primary servo gate and an adjustment value. A second signal of a second reader is processed via a second one of the read channel logic circuits 917 utilizing the secondary servo gate for timing. This can be repeated for additional secondary readers and read channel logic circuits 917 that simultaneously read and process signals from the disk 910 together with the first and second reader signals.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   first and second read channel logic circuits configured to process first and second signals communicated from respective first and second readers, the first and second readers simultaneously reading from a magnetic disk;
   a first servo detection circuit that generates a primary servo gate based on timing data read from the magnetic disk via the first reader, the primary servo gate used for processing the first signal via the first read channel logic; and
   a second servo detection circuit that generates a secondary servo gate based on the primary servo gate and an adjustment value, the secondary servo gate used for processing the second signal via the second read channel logic.

2. The apparatus of claim 1, wherein the adjustment value is based on an estimated physical separation between the first and second readers.

3. The apparatus of claim 2, wherein the adjustment value is further based on an average of at least two values read from each of first and second reference counters associated with the respective first and second servo detection circuits.

4. The apparatus of claim 3, wherein the values comprise $P_1$ and $P_2$ read from the first reference counter and $S_1$ and $S_2$ read from the second reference counter, the values read in the order of $P_1$, $S_1$, $P_2$, $S_2$, and wherein the average comprises $\{(P_1-S_2)+3(P_2-S_1)\}/4$.

5. The apparatus of claim 1, wherein the first and second readers are configured to simultaneously read from a same surface of the magnetic disk.

6. The apparatus of claim 1, further comprising a selector module that selects one of the first or second readers to provide the timing data for the primary servo gate based on a dynamic criterion.

7. The apparatus of claim 6, wherein the dynamic criterion comprises which of the first or second readers first acquires a servo timing lock based on servo marks recorded to the magnetic disk.

8. A method comprising:
   generating a primary servo gate based on a first timing data read from a magnetic disk via a first reader, the first reader associated with a first read channel logic circuit;
   processing a first signal of the first reader via a first read channel logic circuit that utilizes the primary servo gate for timing;
   generating a secondary servo gate based on the primary servo gate and an adjustment value; and
   processing a second signal of a second reader via a second read channel logic circuit that utilizes the secondary servo gate for timing, the first and second readers simultaneously reading from the same magnetic disk.

9. The method of claim 8, further comprising determining that second timing data read from the magnetic disk via the second reader satisfies a criterion, and in response thereto:
generating the primary servo gate based on the second timing data;
utilizing the primary servo gate for timing the second channel logic; and
utilizing the secondary servo gate for timing the first channel logic.

10. The method of claim 9, wherein the criterion comprises acquiring the second timing signal from the magnetic disk via the second reader before acquiring the first timing signal from the magnetic disk via the first reader.

11. The method of claim 9, wherein the adjustment value is based on an estimated physical separation between the first and second readers.

12. The method of claim 11, wherein the adjustment value is further based on an average of at least two values from each of first and second reference counters associated with the respective first and second servo detection circuits.

13. The method of claim 12, wherein the values comprise $P_1$ and $P_2$ read from the first reference counter and $S_1$ and $S_2$ read from the second reference counter, the values read in the order of $P_1$, $S_1$, $P_2$, $S_2$, and wherein the average comprises $\{(P_1-S_2)+3(P_2-S_1)\}/4$.

14. An apparatus, comprising:
interface circuitry configured to receive first and second signals generated by respective first and second readers that read simultaneously from a magnetic disk;
a controller configured to:
generate a primary servo gate based on first timing data detected from the first signal;
process the first signal via a first read channel logic circuit that utilizes the primary servo gate for timing;
generate a secondary servo gate based on the primary servo gate and an adjustment value; and
process the second signal of the second reader via a second read channel logic circuit that utilizes the secondary servo gate for timing.

15. The apparatus of claim 14, wherein the controller is further configured to determining that a second timing data read detected from the second signal satisfies a criterion, and in response thereto:
generate the primary servo gate based on the second timing data;
utilize the primary servo gate for timing the second channel logic; and
utilize the secondary servo gate for timing the first channel logic.

16. The apparatus of claim 15, wherein the criterion comprises acquiring the second timing signal from the magnetic disk via the second reader before acquiring the first timing signal from the magnetic disk via the first reader.

17. The apparatus of claim 15, wherein the adjustment value is based on an estimated physical separation between the first and second readers.

18. The apparatus of claim 17, wherein the adjustment value is further based on an average of at least two values from each of first and second reference counters associated with the respective first and second servo detection circuits.

19. The apparatus of claim 18, wherein the values comprise $P_1$ and $P_2$ read from the first reference counter and $S_1$ and $S_2$ read from the second reference counter, the values read in the order of $P_1$, $S_1$, $P_2$, $S_2$, and wherein the average comprises $\{(P_1-S_2)+3(P_2-S_2)\}/4$.

20. The apparatus of claim 14, wherein the first and second readers are configured to simultaneously read from a same surface of the magnetic disk.

* * * * *